United States Patent [19]

Sistrunk

[11] Patent Number: 5,212,228
[45] Date of Patent: May 18, 1993

[54] STARCH-BASED CORRUGATING ADHESIVE HAVING CROSS-LINKED POLYVINYL ALCOHOL COMPONENTS

[76] Inventor: Donald C. Sistrunk, 3933 Devonshire Dr., Cincinnati, Ohio 45226

[21] Appl. No.: 784,082
[22] Filed: Oct. 31, 1991

Related U.S. Application Data

[63] Continuation of Ser. No. 517,315, May 1, 1990, abandoned, which is a continuation of Ser. No. 295,784, Jan. 11, 1989, abandoned.

[51] Int. Cl.$^5$ .............................................. C08L 61/00
[52] U.S. Cl. .................................. 524/512; 524/503; 525/56; 525/58
[58] Field of Search .................. 524/512, 503; 525/56, 525/58

[56] References Cited

U.S. PATENT DOCUMENTS

| | | | |
|---|---|---|---|
| 3,135,648 | 6/1964 | Hawkins | 428/511 |
| 3,371,004 | 2/1968 | Kennedy | 156/321 |
| 3,488,724 | 1/1970 | Donermeyer | 524/48 |
| 3,498,869 | 3/1970 | Murakami | 156/328 |
| 3,591,534 | 7/1971 | Dunholter et al. | 524/47 |
| 3,720,633 | 3/1973 | Nickerson | 524/48 |
| 4,008,116 | 2/1977 | Sebel | 156/328 |
| 4,018,959 | 4/1977 | Demko et al. | 428/182 |
| 4,094,718 | 6/1978 | Czerwin | 524/503 |
| 4,131,581 | 12/1978 | Coker | 428/507 |
| 4,192,783 | 3/1980 | Bomball et al. | 106/130 |
| 4,211,682 | 7/1980 | Suminoe et al. | 524/503 |
| 4,240,841 | 12/1980 | Didominicis | 106/211 |
| 4,272,295 | 6/1981 | Linke | 106/157 |
| 4,297,144 | 10/1981 | Klein et al. | 106/197 |
| 4,311,804 | 1/1982 | Raghava et al. | 524/503 |
| 4,350,788 | 9/1982 | Shimokawa | 524/309 |
| 4,359,341 | 11/1982 | Allen | 106/213 |
| 4,374,217 | 2/1983 | Miyake et al. | 524/47 |
| 4,442,252 | 4/1984 | Sumi et al. | 524/183 |
| 4,461,858 | 7/1984 | Adelman | 524/503 |
| 4,521,561 | 6/1985 | Hausman | 524/503 |
| 4,600,739 | 7/1986 | Krankkala | 524/47 |
| 4,673,698 | 6/1987 | Krankkais | 524/47 |
| 4,677,145 | 6/1987 | Krankkala | 524/47 |

FOREIGN PATENT DOCUMENTS

| | | |
|---|---|---|
| 3388878 | 3/1977 | Australia . |
| 1381883 | 4/1982 | Australia . |
| 593240 | 2/1960 | Canada . |
| 678317 | 1/1964 | Canada . |
| 1068025 | 11/1979 | Canada . |
| 56159154 | 12/1991 | Japan . |
| 5711042 | 1/1992 | Japan . |
| 1514630 | 11/1975 | United Kingdom . |

OTHER PUBLICATIONS

Considine, Douglas, *Chemical and Process Technology Encyclopedia*, New York, McGraw-Hill, 1974, p. 106.
Article #5, "Special Starch Adhesive Fromualtions"; no author; pp. 38–46.
Article, "Waxes"; ECT 1st edition, vol. 15, pp. 1–17; author: C. J. Marsel, New York University.
Article, "Poly (Vinyl Alcohol) Basic Properties and Uses", author: J. G. Pritchard.
Article, "Polyvinyl Alcohol Properties and Applications", author: C. A. Finch.
Article, "PVA Corrugating Adhesives", author: R. L. Hawkins.
Official Patent Gazette, of Japan; Publicaton No. 45-19600; dated Jul. 4, 1970; Application No. 41-22167; filed Apr. 7, 1966.
Material Safety Data Sheet–author: Air Products and Chemicals, Inc.; "Polyvinyl Alcohol Standard Grades".
Article, "Starch in Papermaking"; no author; pp. 167–168.
Article, "Vinol Polyvinyl Alcohol Dissolving Techniques"; author: Air Products and Chemicals, Inc.

*Primary Examiner*—Joseph L. Schofer
*Assistant Examiner*—J. M. Reddick
*Attorney, Agent, or Firm*—Hovey, Williams, Timmons & Collins

[57] ABSTRACT

Corrugating adhesives and premixes containing polyvinyl alcohol reacted with ketone-aldehyde resins are provided which exhibit stable viscosities and excellent adhesive properties. The premix formulations include PVA reacted with a selected resin, preferably in the absence of starch or borax, in order to yield pourable compositions which retain a stable viscosity over extended storage periods at ambient temperature. The premixes can be added to adhesive formulations including starch, alkali and borax to give corrugating adhesives which resist premature gelation and have good wet tack and adhesive properties.

1 Claim, No Drawings

STARCH-BASED CORRUGATING ADHESIVE HAVING CROSS-LINKED POLYVINYL ALCOHOL COMPONENTS

This application is a continuation of application Ser. No. 07/517,315, filed May 1, 1990, now abandoned, which is a continuation of Ser. No. 07/295,784, filed Jan. 11, 1989, abandoned.

BACKGROUND OF THE INVENTION

1. Field of the Invention

The present invention is broadly concerned with improved starch-based corrugating adhesives, and a premix used in the formulation of such adhesives, which are characterized by the presence of polyvinyl alcohol (PVA) reacted with a ketone-aldehyde resin so as to stabilize the viscosity of the premix, thereby avoiding gelation problems common with PVA-supplemented corrugating adhesives. More particularly, it is concerned with such adhesives and premixes which preferably include fully hydrolyzed PVA reacted with acetone-formaldehyde or urea-formaldehyde resins in the absence of starch and borax to achieve a stabilized PVA in both the premix and final adhesives.

2. Description of the Prior Art

Fabricators of corrugated board or paperboard have long made use of starch-based adhesives. Generally speaking, these adhesives include gelatinized starch, ungelatinized starch, alkali and borax in a water base. Under conditions of heat and pressure during board manufacture, the ungelatinized starch fraction rapidly gelatinizes, thereby absorbing water and rapidly increasing the viscosity and adhesivity of the composition. The presence of borax increases the level of viscosity during the final gelatinization process.

In actual practice, such corrugating adhesives are commonly made using primary and secondary mixers. In the primary mixer, the gelatinized starch fraction is prepared, with the addition of caustic. The secondary mixer normally contains water, borax and ungelatinized starch. The two fractions are the mixed together and may be supplemented with various additives such as cross-linking resins or wax. Such additives may be supplied to the board manufacturer in the form of premixes designed for direct addition to the two starch fractions mixed during final adhesive preparation.

It has also been known in the past to supplement corrugating adhesives with polyvinyl alcohol. PVA in this context is normally added to the adhesive as a finely divided, particulate solid, and is practically insoluble in water at room temperature. At elevated temperatures, however, the PVA becomes soluble and enhances the adhesive properties of the final compositions.

Although the advantages of PVA in corrugated adhesives are known, a number of problems remain. Thus, the use of solid, particulate cold water insoluble PVA does not significantly improve the production rate of corrugating machinery, because of the necessity of elevating the temperature of the PVA so that it becomes soluble.

It has also been suggested to prehydrate the normally cold water insoluble PVA, by mixing the material in warm water. When such hydrated PVA is added to the adhesive, however, problems arise because of premature gelling and reaction with the starch and/or borax constituents of the adhesive.

U.S. Pat. Nos. 4,673,698, 4,600,739, and 4,677,145 describe adhesive and premix systems making use of cold water soluble, partially hydrolyzed PVA having a degree of hydrolysis of less than 91%. According to these patents, such PVA can be employed by carefully controlling the amount of PVA in relation to the boric acid component and taking other steps to insure that the gelation problem is ameliorated.

The water solubility of PVA is directly related to the degree of hydrolysis thereof. PVA is commercially available in a number of hydrolysis grades, e.g., super hydrolyzed (99.3%+ hydrolysis), fully hydrolyzed (98%+ hydrolysis), intermediate hydrolyzed (91-98% hydrolysis), and partially hydrolyzed (85-91% hydrolysis).

SUMMARY OF THE INVENTION

The present invention overcomes many of the problems associated with PVA-supplemented corrugating adhesives and provides such adhesives, and related premixes, which include PVA pre-reacted with a ketone-aldehyde resin. In this fashion, premixes can be formulated which have a substantial degree of viscosity stability with no gelling upon extended storage. Furthermore, final adhesives produced using the reacted PVA-resin mixtures exhibit rapid bonding with good wet tack.

Generally speaking, adhesive premixes in accordance with the present invention are in the form of aqueous compositions including therein respective quantities of polyvinyl alcohol and ketone-aldehyde resin reacted with the polyvinyl alcohol for hydrating and dispensing the latter and stabilizing the viscosity of the compositions. In practice, compositions of the invention are characterized by the property of being pourable after a period of seven days' storage at ambient temperature.

While the use of fully hydrolyzed PVA having a degree of hydrolysis of at least about 98% is preferred, the invention is not so limited. That is, PVA of any commercial grade can be employed, i.e., super, fully, intermediate, and partially hydrolyzed PVAs find utility in the invention. The PVA component is normally present in the premix composition at a level of from about 10-25% by weight, and more preferably at a level of about 15-20% by weight.

The ketone-aldehyde resin component can be selected from a wide variety of known resins of this character, but most advantageously acetone-formaldehyde or urea-formaldehyde resins are used. Such resins are normally present at a level of about 1-15% by weight, and more preferably from about 3-10% by weight in the premix compositions.

In formulating procedures, the premixes are made by initially mixing the dry PVA in water, followed by heating (typically 125°-210° F.), mixing and holding at elevated temperatures for a period of from about 15 minutes to three hours. The mix is then cooled to 100° F. or less, whereupon the selected resin is added with an additional mixing period of from about 1-60 minutes. This procedure produces an aqueous composition which has the desirable properties described above.

In this connection, the mechanism whereby the resin stabilizes the viscosity of the compositions is not fully understood. An increase in viscosity of a PVA solution is normally thought to be due to polymer chains becoming increasingly entangled and associated over time. The forces that attract PVA polymer chains to each other include hydrogen bonding and Vander Waal forces. While water is added to the PVA in the premix compositions of the invention, the dilution factor alone does not appear to account for the extraordinary storage stability of the premixes.

Another possible mechanism is that the resin molecules associate with the PVA polymer chains and thereby inhibit polymer-polymer interactions. A third possibility is that the resin molecules chemically react with PVA molecules and partially substitute hydroxy groups along the backbones of the polymer chains. It should be understood, however, that the inventor does not wish to be bound to any particular theory or mechanism of operation, and as used herein the term "reacted" with regard to the interreaction between PVA and resin should be construed in a broad sense, and not limited to classical chemical reactions as such.

While the exact mechanism giving the desirable storage stability to the premixes of the invention is not fully understood, it is believed significant that the interaction between the PVA and resin occurs in the absence of boric acid compounds (e.g., borax) and starch. Thus, the premixes of the present invention differ fundamentally from prior adhesives which include ketone-aldehyde resins as water-proofing agents. In such situations, the resin is added to the completed adhesive including substantial quantities of starch and borax, for the known purpose of reacting with the starch to effectively remove hydroxyl groups and introduce aliphatic alkylene-type cross-linking moieties during the heating/curing of the adhesive.

The final adhesives of the invention include respective amounts of starch, alkali, a boric acid compound capable of reacting with starch hydroxyl groups to from a starch complex, and the premix described previously. Formulation of these final adhesives advantageously involves separate preparation of gelatinized and ungelatinized fractions which are ultimately mixed, whereupon the PVA premixes of the invention are added.

Final adhesives in accordance with the invention normally include from about 0.04 to 3.9% by weight premix therein, and more preferably from about 0.09 to 2.3% by weight. Correspondingly, the adhesives would contain from about 0.07 to 0.34% by weight PVA, and more preferably from about 0.09 to 0.16% by weight thereof; and from about 0.04 to 1.5% by weight resin, more preferably from about 0.09 to 1.4% by weight resin. The starch fraction of the adhesives should be from about 20.5 to 25.1% by weight, more preferably from about 20.5 to 23.4% by weight. The alkali portion can be supplied through the use of any known base, e.g. sodium or potassium hydroxide, and should be present at a level to give the compositions a basic pH. As is well known, the boric acid compound should be used at a minor level to enhance the adhesive qualities of the final materials.

DESCRIPTION OF THE PREFERRED EMBODIMENTS

The following examples set forth the most preferred premix formulation presently known to the inventor, together with typical and preferred plant formulas for final adhesives. These examples should be taken in an illustrative sense, however, and should not be considered as a limitation upon the overall scope of the invention.

EXAMPLE 1

A preferred PVA premix useful in the formulation of corrugating adhesives may be formulated using the following procedure. 240 gallons of tap water is added to a mixing vessel, followed by the addition of 475 pounds of solid, fully hydrolyzed PVA having a degree of hydrolysis of from about 98–99.8%. This mixture is heated to approximately 200° F., followed by thorough mixing and holding at the elevated temperature for one hour. The mix is then cooled to about 100° F. (or less) and the resin fraction is added. Preferred resins are "E-Z-REZ 2714" or "E-Z-REZ 710". The 2714 product is an acetone-formaldehyde resin in water solution having a formula of $(C_3H_6O.CH_2O)$. The product is further identified as having CAS No. 25619-09-4, formaldehyde polymerized with 2-propanone. This product is commercialized by Corrugated Chemicals, Inc. of Cincinnati, Ohio and is described in a Product Information Bulletin entitled "E-Z-REZ 2714 Weatherproofing Activator", and this brochure is incorporated by reference herein. The E-Z-REZ 710 product is an acetone-formaldehyde resin with urea in water solution and is likewise commercialized by Corrugated Chemicals, Inc. A Product Information Brochure "E-Z-REZ 710 Low Formaldehyde Weatherproof Activator" describing this product is incorporated by reference herein.

In terms of levels of addition, the E-Z-REZ 2714 product should be used at a level of about 315 pounds, whereas the E-Z-REZ 710 is added at a level of about 324 pounds.

The final step in the premix formulation involves mixing of the PVA and resin for a period of about 5 minutes in order to insure homogeneity and appropriate reaction to achieve stable viscosity. The final premix is a pale colored, readily pourable liquid which remains in pourable condition during storage at ambient temperatures over an extended period.

EXAMPLE 2

A typical corrugating adhesive produced using primary and secondary mixers in a corrugating plant is formulated as follows. 100 gallons of water is first added to the primary mixer, followed by heating to 100° F. Carrier starch (150–400 pounds depending upon type of carrier) is added to the heated water followed by additional heating to 130°–150° F. Sodium hydroxide (25–35 pounds) is then added, followed by mixing for 30 minutes and the addition of supplemental water (65–100 gallons).

280–330 gallons of water are added to the secondary mixer, followed by heating to 90°–100° F. 1,500 pounds corn starch are next added to the heated water, followed by the addition of borax (18–25 pounds). This mixture is heated to insure an even blend.

The contents of the primary mixer are then dropped into the second mixer over a period of 5–40 minutes, followed by a mixing period of 10–30 minutes. Premix of the type described in Example 1 is then added at a level of about 5–10 gallons with a final mixing period of about 10–20 minutes. This produces a highly acceptable corrugating adhesive exhibiting excellent bonding and wet tack.

EXAMPLE 3

Another final adhesive composition can be made as follows. 100 gallons of water is first added to the primary mixer, followed by heating to 100° F. 150 pounds of wheat starch carrier (Fiber-Lok Carrier Starch commercialized by Corrugated Chemicals, Inc.) is then added with heating to 120° F. 24 pounds of caustic (37% sodium hydroxide) is then added, along with 65 gallons of additional water.

365 gallons of water, 20 pounds of borax, 1,000 pounds of corn starch and 1 pound of preservative are added to the secondary mixer, with sufficient mixing to achieve an even blend.

The contents of the primary mixer are then dropped into the secondary mixer over a period of 25-30 minutes, whereupon the entire composition is mixed for an additional 5-10 minutes. Five gallons of the premix of Example 1 are then added with final mixing.

I claim:

1. A premix composition for addition to a starch-based corrugating adhesive, said premix composition consisting essentially of water, polyvinyl alcohol and a resin selected from the group consisting of ketone-aldehyde resins and ureaformaldehyde resins and in the absence of borax and starch, said premix being formed by mixing said polyvinyl alcohol in water, heating the mixture to a temperature from about 125°-210° F., holding the mixture at said temperature for a period of about 15 minutes to 3 hours, allowing the mixture to cool to a temperature of about 100° F. or less, and thereafter adding said resin thereto to effect reaction of the resin with the polyvinyl alcohol to disperse the polyvinyl alcohol and stabilize the viscosity of the composition, there being from about 10 to 25 weight percent of polyvinyl alcohol and from about 1 to 15 weight percent of said resin, said composition being pourable after a period of 7 days storage at ambient temperature.

* * * * *